Jan. 30, 1962    N. MOORE    3,018,806
APPARATUS FOR CUTTING BAGELS OR THE LIKE
Filed Jan. 6, 1958
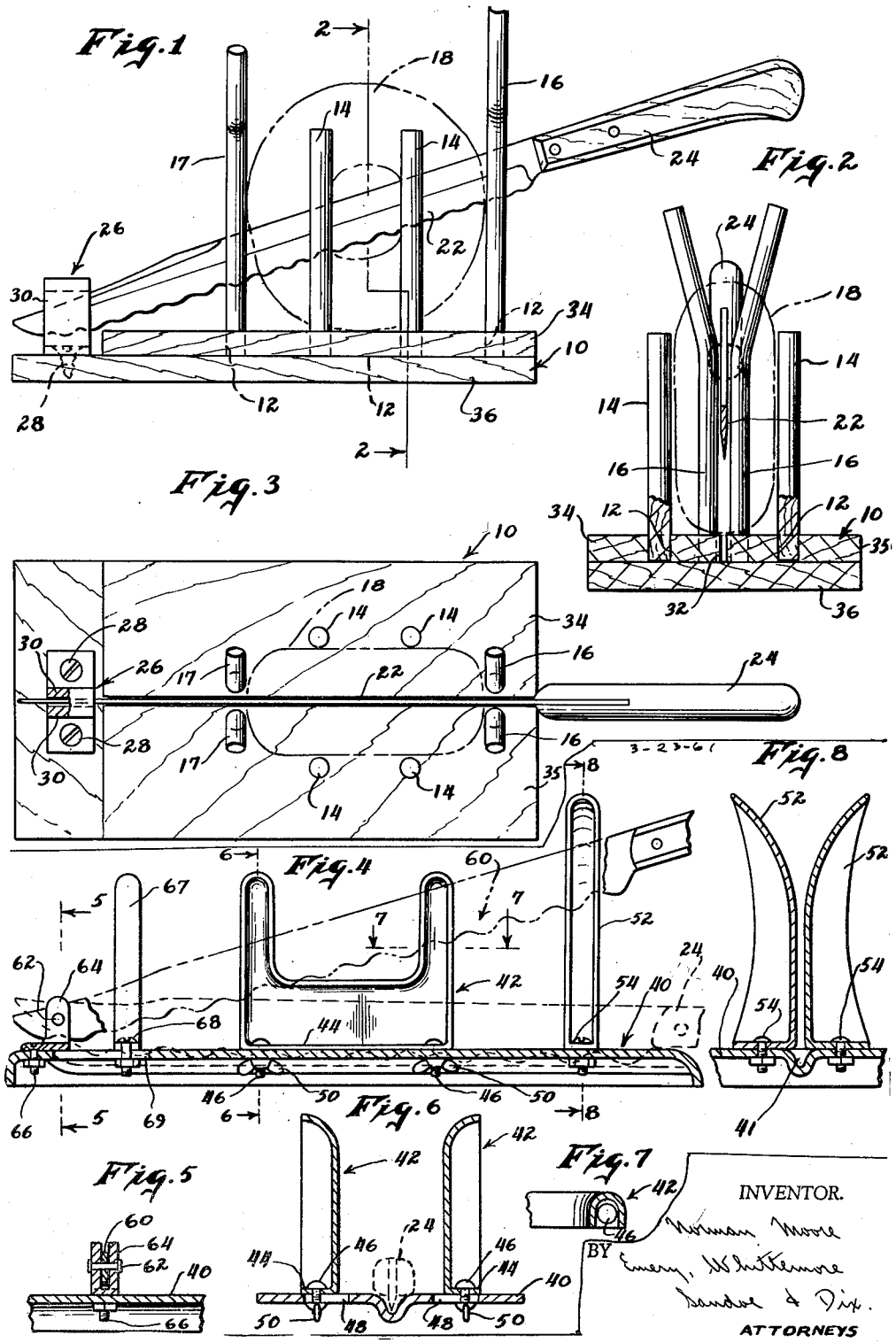

United States Patent Office

3,018,806
Patented Jan. 30, 1962

3,018,806
APPARATUS FOR CUTTING BAGELS OR
THE LIKE
Norman Moore, 84—09 35th Ave.,
Jackson Heights, N.Y.
Filed Jan. 6, 1958, Ser. No. 707,222
5 Claims. (Cl. 146—150)

This invention relates to cutting apparatus and more especially to cutting apparatus which is particularly suitable for cutting bagels.

The bagel is a very hard roll which is used extensively by Jewish people and which is ordinarily served by first slicing it. Because of the hardness of the bagel crust, and the comparative narrowness of the bagel, it is a common experience for persons to have the knife slip and cut the hand by which the bagel is being held. It is an object of this invention to provide a bagel cutter which not only holds the bagel in position but also provides means for guiding the knife.

A person cutting a bagel with this invention does not touch the bagel; and even if the knife should slip there is no possibility of cutting one's hand. The invention is made with guide means for preventing transverse movement of both the bagel and the knife so that the bagel can be sliced across its mid region in accordance with the manner in which it is usually sliced by hand.

One object of the invention is to provide a simple and very inexpensive bagel cutter. In the preferred construction of this simple form of the invention, a base is provided with a plurality of cylindrical openings or sockets, and posts are pressed into the sockets in positions to provide retainers at opposite sides of the bagel for holding it upright; and more closely spaced posts at the end of the bagel supporting area to prevent longitudinal movement of the bagel and at the same time guide the knife. Means are preferably provided at the other end of the supporting area which serve as a fulcrum for the knife.

Other objects, features and advantages of the invention will appear or be pointed out as the description proceeds.

In the drawing, forming a part hereof, in which like reference characters indicate corresponding parts in all the views:

FIGURE 1 is a side elevation of a bagel cutter made in accordance with this invention;

FIGURE 2 is a sectional view taken on the line 2—2 of FIGURE 1; and

FIGURE 3 is a top plan view of the bagel cutter shown in FIGURES 1 and 2.

FIGURES 1-3 show the invention in its simplest form. It has a base 10 with cylindrical sockets 12 for receiving posts 14, 16 and 17. There are four side posts 14, two posts 16 at the front of the apparatus, and two posts 17 at the rear, in the construcion illustrated.

The two posts 14 on each side support a bagel 18 in an upright position. The bagel 18 rests on the area of the base 10 between the rows of posts 14.

The end posts 16 are located midway across the forward end of the area on which the bagel 18 is supported; and the lower portions of the posts 16 have their confronting faces close to one another so as to provide a guide for a knife blade 22. The knife has a handle 24 beyond the end of the base 10. The upper ends of the posts 16 diverge from one another so as to form a flaring entrance for the knife guide.

The end posts 16 prevent forward displacement of the bagel, and the other end posts 17 prevent rearward displacement of the bagel. These rearward end posts 17 are closely spaced and provided with diverging upper end portions so as to serve as another guide for the knife blade 22.

At its pointed end, the knife blade extends into a holder 26 attached to the base 10, at the end of the base remote from the posts 16. In the construction shown, the holder 26 is attached to the base by screws 28. The holder 26 has upwardly extending side walls or uprights 30 with clearance between them for receiving the knife blade 22 and the top of the holder 26 connects the upper ends of the uprights 30 and prevents the knife blade from moving upwardly at its lower end. The top of the holder 26 serves, therefore, as a fulcrum about which the knife is moved angularly when slicing the bagel 18.

Because of the slope of the knife blade 22, pressure of the knife against the bagel 18 tends to move the bagel toward the front of the base 10, that is, toward the front posts 16. These posts 16 serve as front retaining means for keeping the bagel in position under the knife blade, as previously explained; and the posts 14 serve as intermediate retainers for holding the bagel upright. In the construction shown in FIGURES 1-3, the posts 14 and 16, and the base 10, are made of wood.

The knife blade 22 is constructed with a scalloped or serrated cutting edge so as to slice the bagel without requiring any forward and backward movement of the knife blade. In the operation of the cutting apparatus the knife blade 22 is first moved upwardly and in a counter-clockwise direction about its fulcrum at the holder 26. After inserting the bagel under the knife blade, the handle 24 is pushed downwardly and the blade 22 moves angularly, in a clockwise direction, about its fulcrum at the holder 26. The base 10 is made with a groove 32 (FIGURE 2), under the bagel between two blocks 34 and 35 secured to a bottom panel 36 to form the base 10. This groove 32 provides clearance to permit the knife to slice completely through the bagel.

The preferred embodiments of the invention have been illustrated and described, but changes and modifications can be made, and some features can be used in different combinations without departing from the invention as defined in the claims.

What is claimed is:

1. Apparatus for cutting bagels or the like including in combination a base having an area on which the bagel is supported, and having a plurality of sockets in the base on both sides of said area, posts having lower end portions that fit into said sockets and having upper portions which extend for a substantial distance above the top of the base, different posts on both sides of the area being independent of one another, said posts including forward posts at the front end of the area and closely spaced from one another throughout most of their length, the forward posts having their upper portions flaring outwardly away from one another in an upward direction to provide a flaring entrance for a guideway between the forward posts for a slicing knife, and a pair of rearward posts at the back of said area, closely spaced but having clearance between them for receiving the knife.

2. The apparatus for cutting bagels or the like described in claim 1, and in which the base and the posts are made of wood, and the sockets and the lower end portions of the posts are cylindrical.

3. The apparatus described in claim 2, and in which the posts fit tightly into the sockets and are held against displacement and rotation entirely by their friction with the sides of the sockets.

4. The apparatus described in claim 1, and in which the base has a center grove extending in the direction of the length of the knife and for a substantial distance below the surface of the base through which the sockets open.

5. The apparatus described in claim 1, and in which the base is of composite construction and includes a board extending across the full width of the apparatus, and includes also two blocks spaced from one another by a clearance that leaves a groove between the blocks extending in the direction of the length of the knife and located in position to receive the lower end portion of the knife at the end of a cutting operation, said area being on the top surfaces of the blocks and the sockets of the posts opening through the top surfaces of said blocks.

References Cited in the file of this patent

UNITED STATES PATENTS

| | | |
|---|---|---|
| 499,650 | Breitenbach | June 13, 1893 |
| 1,830,284 | Massa | Nov. 3, 1931 |
| 1,866,960 | Zimmer | July 12, 1932 |
| 1,953,137 | Streckfuss | Apr. 3, 1934 |

FOREIGN PATENTS

| | | |
|---|---|---|
| 46,139 | Switzerland | Feb. 12, 1912 |
| 446,939 | Germany | July 13, 1927 |
| 630,923 | Germany | June 9, 1936 |
| 835,936 | Germany | Apr. 7, 1952 |